Figure 3:
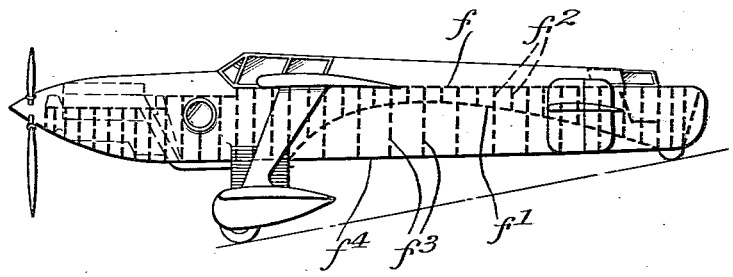

Jan. 20, 1942.   C. J. H. MACKENZIE-KENNEDY   2,270,635
AIRPLANE
Filed Feb. 25, 1937   2 Sheets-Sheet 1
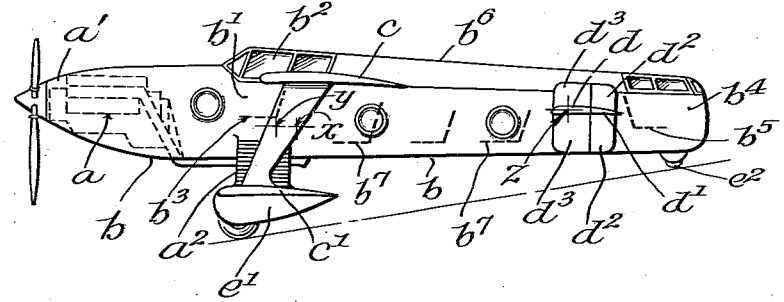
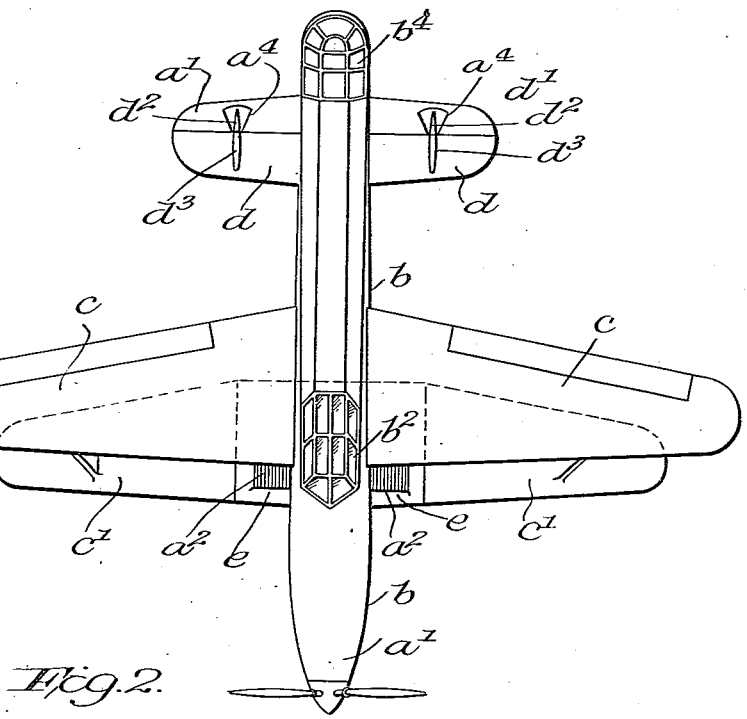
Inventor
C. J. H. Mackenzie-Kennedy Jan. 20, 1942.   C. J. H. MACKENZIE-KENNEDY   2,270,635
AIRPLANE
Filed Feb. 25, 1937   2 Sheets-Sheet 2

Inventor
C. J. H. Mackenzie-Kennedy.

Patented Jan. 20, 1942

2,270,635

UNITED STATES PATENT OFFICE 2,270,635

AIRPLANE

Chessborough J. H. Mackenzie-Kennedy, New York, N. Y.; Betty Mackenzie-Kennedy, New York, N. Y., administratrix of said Chessborough J. H. Mackenzie-Kennedy, deceased Application February 25, 1937, Serial No. 127,726

15 Claims. (Cl. 244—13)

The present invention (this application being a continuation in part of my application Ser. No. 705,791, filed January 8, 1934) is an airplane provided with a hollow body or fuselage extending to or aft of its tail surfaces; the said hollow body or fuselage having passageway and other accommodation for passengers and/or crew and/or cargo from behind the engine or engines to the tail-end of the said body or fuseleage in the cases of an airplane with an engine or engines in the front portion of its body or fuselage and of an airplane having the said engine installation together with an engine or engines on either side of its body or fuselage attached thereto and/or to its main plane or wing or main planes or wings, or from end to end of the said body or fuselage in the case of a multi-engined airplane having its engines attached only to its body or fuselage side or sides and/or to its main plane or wing or main planes or wings; and in which airplane the maximum weight in passengers and/or crew and/cargo can freely be moved safely during flight from end to end of the said accommodation without upsetting the areodynamic stability of the airplane—the said maximum weight, in the preferred embodiment of the invention, being equivalent to at least one-sixteenth part of the gross weight of the airplane fully loaded.

Provision in an airplane for the said movement therein of the said load without upsetting the aerodynamic stability of the airplane, supplies for the first time in the history of aviation a definite yardstick enabling maximum economy in the design of a plural place hollow-bodied or cabined airplane, and maximum utility, controllability and maneuverability thereof. It enables, as well, the body or fuselage of an aeroplane to be constructed on the principle of a single span arch bridge, taperingly supported from the ends to the middle, and, so, much lighter without loss of strength.

The said provision in an airplane for the said movement therein of the said load without upsetting the aerodynamic stability of the airplane, enables, besides, advantageous dispensing with the gun station or gun stations between the main plane or wing or main planes or wings and the tail surfaces of a warplane; and the stepping-up above each other of forward and tail gun stations in a warplane.

In carrying out the invention an airplane is designed with the distance between the airplane's center of gravity and the center of pressure of its tail plane or planes as a principal factor, and kept as short as possible with safety. Thus, the airplane's tail surfaces are preferably placed sufficiently in front of the tail-end of the airplane's body or fuselage to enable an observer in the said tail-end to have an unobstructed view of approximately 215° vertically and horizontally. With the said restriction of the distance between the airplane's center of gravity and the center of pressure of its tail plane adhered to, the dead or fixed weights and horizontal and vertical surfaces of the airplane should be made to balance as far as possible fore and aft of the airplane's center of gravity so as to minimize as much as possible any upsetting effect of the aforesaid movement in the airplane of the aforesaid weight. The proportions of the airplane's main plane or wing or main planes or wings and tail plane or tail planes, and the assemblage of these components and the airplane's body or fuselage should be made such that the airplane's stability in flight is neutral when the said weight is in the tail-end of the airplane's body or fuselage, and is increased when the said weight or any part thereof is moved forward from the said tail-end.

Figure 4:
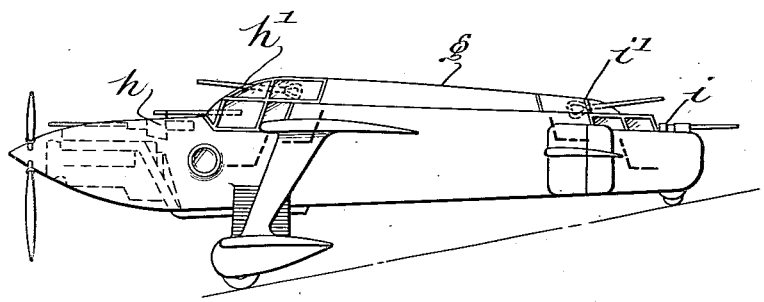

Without further general discussion and description, I shall proceed to explain in particular the invention with reference to the accompanying drawings in which:

Figure 1 is a side elevation of a single-engined tractor biplane embodying the invention; Figure 2 is a plan view of the airplane of Figure 1; Figure 3 is a side elevation of a single-engined tractor biplane similar to that of Figures 1 and 2 but embodying a different form of fuselage construction, and Figure 4 is a side elevation of an airplane embodying the principles disclosed in Figures 1 and 2 but providing stepped-up forward and tail gun stations.

Referring first to Figures 1 and 2, the tractor screw fitted engine $a$ is liquid cooled, and develops preferably not less than 1000 H. P. at an altitude of 15,000 feet. The overall length of the body or fuselage $b$ in this specific example, is 35 feet. The span of the upper main plane $c$ is 40 feet, and of the lower main plane $c^1$ is 32 feet. The mean chord of the main planes $c$ and $c^1$ is 10 feet. The total area of these main planes is 400 sq. ft. The wing lift coefficient is 0.5.

The area of the monoplane tail plane $d$ is 60 sq. feet or 15 per cent of the said main plane area. Reference numerals $d^1$ designate elevators attached to the tail plane $d$; and $d^2$ rudders disposed at the trailing edges of vertical fins $d^3$, the rudders working in segmental cutouts $d^4$ in the elevators $d^1$. As here shown, this entire tail assembly is disposed at the sides of the body or fuselage $b$ below the top thereof, and sufficiently ahead of its tail-end $b^4$ to enable an observer therein to have a clear view of about 215° vertically and horizontally.

Reference numeral $a^1$ designates the torpedo-like streamlined engine cowling; $b^1$ the enclosed pilot's cockpit or cabin; $b^2$ the raised windowed roof portion of the said pilot's cockpit or cabin; $b^3$ the pilot's seat; $b^4$ the enclosed, roofed and windowed tail-end cockpit or cabin, which tail-end chamber may be made as an open cockpit or as a cockpit protected forward by a raised roof portion slidable along and under the rear end of the fairing $b^6$ which connects the said fore and aft roof portions and, so, enhances streamline effect and provides additional head room in the intermediate body portion to permit the aforesaid movement of the aforesaid weight; $b^5$ a seat in the said tail-end $b^4$; $b^7$ seats in the intermediate, windowed portion of the body $b$, which seats and the intermediate windows shown may be dispensed with; $a^2$ the engine cooling coils arranged around the landing carriage struts $e$; $e^1$ the landing carriage fairings and wheels; and $e^2$ the tail-end landing wheel and fairing, which tail landing gear is not loaded more than according to common practice by reason of this invention.

As here contemplated, the weight of the airplane empty is 4,100 lbs., and its weight fully loaded (including fuel for 3 hours) is 7,200 lbs. Thus, in the case of this example of the invention, the aforesaid weight that can be moved as also aforesaid is at least 450 lbs. Therefore, in the case of a smaller airplane embodying the invention and weighing fully loaded only 4,000 lbs., the said weight that can be moved as stated is at least 250 lbs.; in the case of a larger airplane of this kind weighing fully loaded 24,000 lbs., the said weight that can be moved as stated is at least 1,500 lbs.; and in the case of a still larger airplane of the same kind weighing fully loaded 96,000 lbs., the said weight that can be moved as stated is at least 6,000 lbs. Consequently, an airplane embodying this invention can safely be piloted in any naturally disturbed condition of the atmosphere much as an ocean going vessel proportioned to do so can be sure of always resting upon at least two naturally formed waves.

As here also shown, the fuselage or body $b$ is extended forwardly beyond the main planes $c$ and $c^1$ a greater distance than usual, this extension being readily effected by the use of correspondingly extended longerons, the extension supporting the tractor screw fitted engine $a$ in an unusually advanced position also. However, the forward placement of the body $b$ and engine $a$ is subject to the placement of the other fixed weights of the airplane, and it does not overbalance ahead of the airplane's center of gravity the weight of the deepened rear portion of the body $b$ and the said weight of 450 lbs., in passangers and/or crew and/or cargo, that can freely be moved during flight from behind the engine $a$ into the body's tail $b^4$, and vice versa, as aforesaid. Moreover, the side or vertical surface (usually termed "lateral fin area") placed ahead of the airplane's center of gravity is subject to the lateral fin area placed behind the said center of gravity, and does not overbalance the said rear lateral fin area.

The airplane of Figures 1 and 2, proportioned as above specified, is so assembled that the distance of its center of gravity $x$ aft of the aerodynamic center $y$ of its main planes $c$ and $c^1$ is 1.1 feet. The distance between the airplane's center of gravity and the center of pressure $z$ of its tail plane $d$ is restricted to between 37 per cent and 38 per cent of the said 35 feet overall length of the airplane's body $b$. In airplanes embodying this invention, the distance between the airplane's center of gravity and the center of pressure of its tail plane or planes should preferably be made between the minimum of 30 per cent and the maximum of 40 per cent of the overall length of the airplane's body or fuselage, the said distance naturally governing the distance between the airplane's center of gravity and the hinging axis of its elevator, which latter distance, accordingly, is less than fifty per cent of the overall length of the body or fuselage.

In one mode of contemplation, the airplane of the present invention, in a preferred form, considered as a re-design of the usual airplane wherein cockpits or chambers are confined to the vicinity of the center of gravity, retains substantially the same body length to the rear of the main plane, the tail surfaces being moved forward to provide room for the rear cockpit or chamber therebehind. For example, taking an ordinary airplane with the usual proportions of main and tail surfaces and the usual distance between the center of gravity and the center of pressure of its tail surfaces, it may be conceived that, to arrive at the airplane of the present invention, the main and tail plane surfaces and the body length behind the main plane would be substantially retained, the rear extremity of the body would be deepened and strengthened to provide a rear cockpit or chamber, the tail surfaces would be moved into a position forward of the rear cockpit or chamber, thereby shortening the distance between the center of gravity and the center of pressure of the tail surfaces, and the engine would be advanced to balance the increased weight and lateral fin area at the rear of the body.

All the airplanes wherein a body cockpit is provided at or aft of the tail surfaces, which have been hitherto described and ascertained in publications and/or made and/or used, have been so described and ascertained and/or made and/or used since the year 1918. The distance between the airplane's center of gravity and the center of pressure of its tail plane has been made in all these airplanes between 48 per cent and 53 per cent of the overall length of their bodies or fuselages and, so, has enabled these airplanes with stability and safety to carry in their body tail-ends and to allow freely to move fore and aft in their bodies during flight as hereinbefore described (which is also proven by the lack of accommodation for more in the said body tail-ends, and by all these airplanes being multi-engined—with engines mounted on either side of their bodies or fuselages and attached thereto and/or to their main planes or wings, and by all these airplanes having been produced for war service—which service is not usually synonymous with economy), a maximum weight in passengers and/or crew and/or cargo of approximately only one-fiftieth part of the fully loaded weight of these airplanes; and, thereby, maintained the dimensions and engine power employed of these airplanes as much more or much less economical for any given power of engine, airplane weight fully loaded, speed, climb, endurance and other performance, than the dimensions and engine power employed of airplanes embodying this invention; and, consequently, kept the extents of stability, controllability, maneuverability and utility of the former airplanes correspondingly much inferior to those of airplanes embodying this invention.

As here described and shown, subject to the said restriction of the distance between the airplane's center of gravity and the center of pressure of its tail plane $d$ to between 37 per cent and 38 per cent of the said 35 feet overall length of the airplane's body $b$, and flowing as it were from this restriction, the airplane's fixed weights and horizontal and vertical surfaces have been so balanced fore and aft of the said center of gravity; and the proportions of its main planes or wings $c$ and $c^1$ and of its tail plane $d$, and the assemblage of these components and the airplane's body $b$, have been made such that, as further features of this invention, the airplane's stability in flight is neutral when the said weight of 450 lbs. or thereabouts is in the tail-end $b^4$ of the airplane's body $b$, and the said stability is increased when this weight of 450 lbs., or any part thereof, is moved forwardly in the airplane's body $b$ from its said tail-end $b^4$.

The loading of the airplane's main planes or wings $c$ and $c^1$ is 18 lbs. per sq. ft., and the airplane's power loading is 7.2 lbs. per H. P. Its estimated top speed is 285 M. P. H. at 15,000 feet; cruising speed is 240 M. P. H. at 15,000 feet; landing speed (with flaps) is 55 M. P. H.; rate of climb is 15,000 feet in 5 mins.; minimum range is 720 miles; service ceiling is 37,000 feet; equipped with controllable-pitch tractor screw, dual radiators, audiphone, oxygen, and radio.

The above specifications with reference to Figures 1 and 2 have been given as typical and are by no means to be taken as restrictive of the invention. The stated proportions, or substantially such proportions, may be applied to airplanes of various sizes, and with engine installations or power plants constituted by a single engine or a plurality of engines, under the invention as hereinafter claimed. It is to be particularly understood that I have given the definite specifications of one size of airplane merely for the purpose of facilitating the clear expression of the principles underlying my invention.

In Figure 3 I have shown the after part of the fuselage constructed on the principle of a single span arch bridge. The frame work comprises, at each side of the fuselage, a truss foundation including a top substantially rectilinear longitudinal member $f$, a lower arch member $f^1$, and vertical members $f^2$ rigidly joining members $f$ and $f^1$. Suspension members $f^3$ provide a relatively light construction supporting a longitudinal $f^4$ which serves as a floor supporting member.

Figure 4 is a side elevation of a suitably large and powerful single-engined biplane embodying this invention, and showing stepped-up forward and tail gun stations $h$ and $h^1$, and $i$ and $i^1$ joined by a relatively elevated roof portion $g$.

It will be understood that the present invention is applicable to airplanes of specifically different design than those herein described, and accordingly I do not limit myself except as in the following claims.

I claim:

1. An airplane comprising a hollow body providing a longitudinal passageway, a main plane associated with the forward portion of said body, a tail plane associated with the rear portion of said body, an elevator hinged to said tail plane, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, a power plant occupying an advanced position in order to give balance to the airplane with respect to the increased tail weight without substantial increase in the usual ratio of tail plane surface to main plane surface and the forward extension of the body providing added lateral fin area in compensation of the substantial depth of the rear end of the body, the distance between the center of gravity of the airplane and the hinging axis of the elevator being confined to a distance less than fifty per cent of the overall length of the body, such confining of said distance enabling the advanced positioning of the power plant to be kept at a minimum, the proportioning and balancing of the whole being such as to enable free movement within said body between the center of gravity of the airplane and rear cockpit or chamber of a weight equal to at least one-sixteenth that of the airplane when fully loaded, the stability of the airplane being neutral when the said weight is in the tail end of the body and increasing when the said weight or any part thereof moves toward the center of gravity.

2. An airplane according to claim 1 wherein the tail plane and elevator comprise portions arranged at the sides of the body and vertical fins and rudders are provided at each side of the body, all of such rear surfaces occupying a low position with respect to the body and being disposed forward of the rear cockpit or chamber.

3. An airplane according to claim 1 which considered as a re-design of the usual airplane, retains substantially the same body length to the rear of the main plane, the tail surfaces being moved forward to provide room for the rear cockpit or chamber therebehind.

4. An airplane according to claim 1, wherein the body aft of the main plane has a truss construction including truss members with upwardly arched lower longitudinals.

5. An airplane according to claim 1, wherein the rear portion of the body is adapted to house superposed gun emplacements.

6. An airplane comprising a hollow body providing a longitudinal passage, a main plane associated with the forward portion of said body, a tail plane associated with the rear portion of said body, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, an engine installation occupying an advanced position in order to give balance to the airplane with respect to the increased tail weight and the forward extension of the body providing added lateral fin area in compensation of the substantial depth of the rear end of the body, the distance between the center of gravity of the airplane and the center of pressure of the tail plane being restricted to the minimum of 30 per cent and the maximum of 40 per cent of the overall length of said body.

7. An airplane comprising a hollow body providing a longitudinal passage, a main plane associated with the forward portion of said body, a tail plane associated with the rear portion of said body, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, an engine installation occupying an advanced position in order to give balance to the airplane with respect to the increased tail weight and the forward extension of the body providing added lateral fin area in compensation of the substantial depth of the rear end of the body, the distance between the center of gravity of the airplane and the center of pressure of the tail plane being restricted to the minimum of 30 per cent and the maximum of 40 per cent of the overall length of said body, the proportioning and balancing of the whole being such as to enable free movement within said body between the center of gravity of the airplane and the rear cockpit or chamber of a weight equal to at least one-sixteenth that of the airplane when fully loaded.

8. An airplane comprising a hollow body providing a longitudinal passage, a main plane associated with the forward portion of said body, a tail plane associated with the rear portion of said body, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, an engine installation occupying an advanced position in order to give balance to the airplane with respect to the increased tail weight and the forward extension of the body providing added lateral fin area in compensation of the substantial depth of the rear end of the body, the distance between the center of gravity of the airplane and the center of pressure of the tail plane being restricted to the minimum of 30 per cent and the maximum of 40 per cent of the overall length of said body, the proportioning and balancing of the whole being such as to enable free movement within said body between the center of gravity of the airplane and the rear cockpit or chamber of a weight equal to at least one-sixteenth that of the airplane when fully loaded, the stability of the airplane being neutral when the said weight is in the tail end of the body and increasing when the said weight or any part thereof moves toward the center of gravity.

9. An airplane comprising a hollow body providing a longitudinal passage, a main plane associated with the forward portion of said body, a tail plane associated with the rear portion of said body, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, an engine installation occupying an advanced position in order to give balance to the airplane with respect to the increased tail weight without substantial increase in the usual ratio of tail plane surface to main plane surface and the forward extension of the body providing added lateral fin area in compensation of the substantial depth of the rear end of the body, the distance between the center of gravity of the airplane and the center of pressure of the tail plane being restricted to the minimum of 30 per cent and the maximum of 40 per cent of the overall length of said body.

10. An airplane comprising a hollow body providing a longitudinal passage, a main plane associated with the forward portion of said body, a tail plane associated with the rear portion of said body, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, an engine installation occupying an advanced position in order to give balance to the airplane with respect to the increased tail weight without substantial increase in the usual ratio of tail plane surface to main plane surface, and the forward extension of the body providing added lateral fin area in compensation of the substantial depth of the rear end of the body, the distance between the center of gravity of the airplane and the center of pressure of the tail plane being restricted to the minimum of 30 per cent and the maximum of 40 per cent of the overall length of said body, the proportioning and balancing of the whole being such as to enable free movement within said body between the center of gravity of the airplane and the rear cockpit or chamber of a weight equal to at least one-sixteenth that of the airplane when fully loaded.

11. An airplane comprising a hollow body providing a longitudinal passage, a main plane associated with the forward portion of said body, a tail plane associated with the rear portion of said body, said body being extended forwardly beyond the main plane, the rear extremity of said body being of substantial depth and accommodating a cockpit or chamber with which said passageway communicates, there being a forward cockpit or chamber at or about the center of gravity of the airplane with which said passageway communicates, an engine installation occupying an advanced position in order to give balance to the airplane with respect to the increased tail weight without substantial increase in the usual ratio of tail plane surface to main plane surface, and the forward extension of the body providing added lateral fin area in compensation of the substantial depth of the rear end of the body, the distance between the center of gravity of the airplane and the center of pressure of the tail plane being restricted to the minimum of 30 per cent and the maximum of 40 per cent of the overall length of said body, the proportioning and balancing of the whole being such as to enable free movement within said body between the center of gravity of the airplane and the rear cockpit or chamber of a weight equal to at least one-sixteenth that of the airplane when fully loaded, the stability of the airplane being neutral when the said weight is in the tail end of the body and increasing when the said weight or any part thereof moves toward the center of gravity.

12. An airplane according to claim 6 wherein an elevator is hinged to the tail plane and both comprise portions arranged at the sides of the body and wherein vertical fins and rudders are also provided at each side of the body, all of such rear surfaces occupying a low position with respect to the body and being disposed forward of the rear cockpit or chamber.

13. An airplane according to claim 6, which considered as a re-design of the usual airplane, retains substantially the same body length to the rear of the main plane, the tail surfaces being moved forward to provide room for the rear cockpit or chamber therebehind.

14. An airplane according to claim 6, wherein the body aft of the main plane has a truss construction including truss members with upwardly arched lower longitudinals.

15. An airplane according to claim 6, wherein the rear portion of the body is adapted to house superposed gun emplacements.

CHESSBOROUGH J. H. MACKENZIE-KENNEDY.